US00H002269H

(19) United States

(12) Statutory Invention Registration

Manuel-Devadoss (Johnson Smith)

(10) Reg. No.: US H2269 H

(43) Published: Jun. 5, 2012

(54) AUTOMATED SPEECH TRANSLATION SYSTEM USING HUMAN BRAIN LANGUAGE AREAS COMPREHENSION CAPABILITIES

(76) Inventor: Johnson Manuel-Devadoss (Johnson Smith), Chennai (IN)

(21) Appl. No.: 12/622,627

(22) Filed: Nov. 20, 2009

(51) Int. Cl.
*G06F 17/28* (2006.01)
*G06F 17/27* (2006.01)

(52) U.S. Cl. ..... 704/2; 704/E15.001; 704/9

(58) Field of Classification Search ..... 704/2, 704/9, E15.001; 379/88.01, 907
See application file for complete search history.

(56) References Cited

U.S. PATENT DOCUMENTS

| | | | | | |
|---|---|---|---|---|---|
| 3,335,225 | A | * | 8/1967 | Samuel et al. | 704/209 |
| 4,641,264 | A | * | 2/1987 | Nitta et al. | 704/4 |
| 4,882,681 | A | * | 11/1989 | Brotz | 704/3 |
| 6,161,082 | A | * | 12/2000 | Goldberg et al. | 704/3 |
| 6,385,195 | B2 | * | 5/2002 | Sicher et al. | 370/356 |
| 7,574,357 | B1 | * | 8/2009 | Jorgensen et al. | 704/236 |
| 7,689,426 | B2 | * | 3/2010 | Matula | 704/270.1 |
| 8,041,023 | B1 | * | 10/2011 | James et al. | 379/265.03 |
| 2002/0035474 | A1 | * | 3/2002 | Alpdemir | 704/270 |
| 2003/0212558 | A1 | * | 11/2003 | Matula | 704/260 |
| 2004/0186743 | A1 | * | 9/2004 | Cordero | 705/1 |
| 2007/0291924 | A1 | * | 12/2007 | Matula | 379/265.09 |
| 2009/0022284 | A1 | * | 1/2009 | Matula | 379/88.04 |
| 2009/0157410 | A1 | * | 6/2009 | Donohoe | 704/270 |
| 2010/0082325 | A1 | * | 4/2010 | Johnson | 704/2 |
| 2011/0046941 | A1 | * | 2/2011 | Johnson | 704/3 |
| 2011/0125483 | A1 | * | 5/2011 | Johnson | 704/2 |

* cited by examiner

*Primary Examiner*—Daniel Pihulic

(57) ABSTRACT

The present invention is an "Automated Speech Translation System using Human Brain Language Areas Comprehension Capabilities". It discloses a method to address the most common variation in the world, which is communication gap between people of different ethnicity. Imagine a world where we can communicate with our natural language to everyone without the need of human translators, interpreters, hand-held device and language translation books. In order to facilitate language translation, this present invention recognizes the speech in voice pitches, collects the language comprehensive information from each recipient's brain language areas within the audible range and sends it to "voice processing center" for analyzing. Then, it translates the collected voice pitches of speech to natural language of recipient(s) by using language dictionaries database. The translated language is retransmitted in audible frequency to one or plurality of recipients where the brain language areas of one or plurality of recipients can comprehend.

16 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

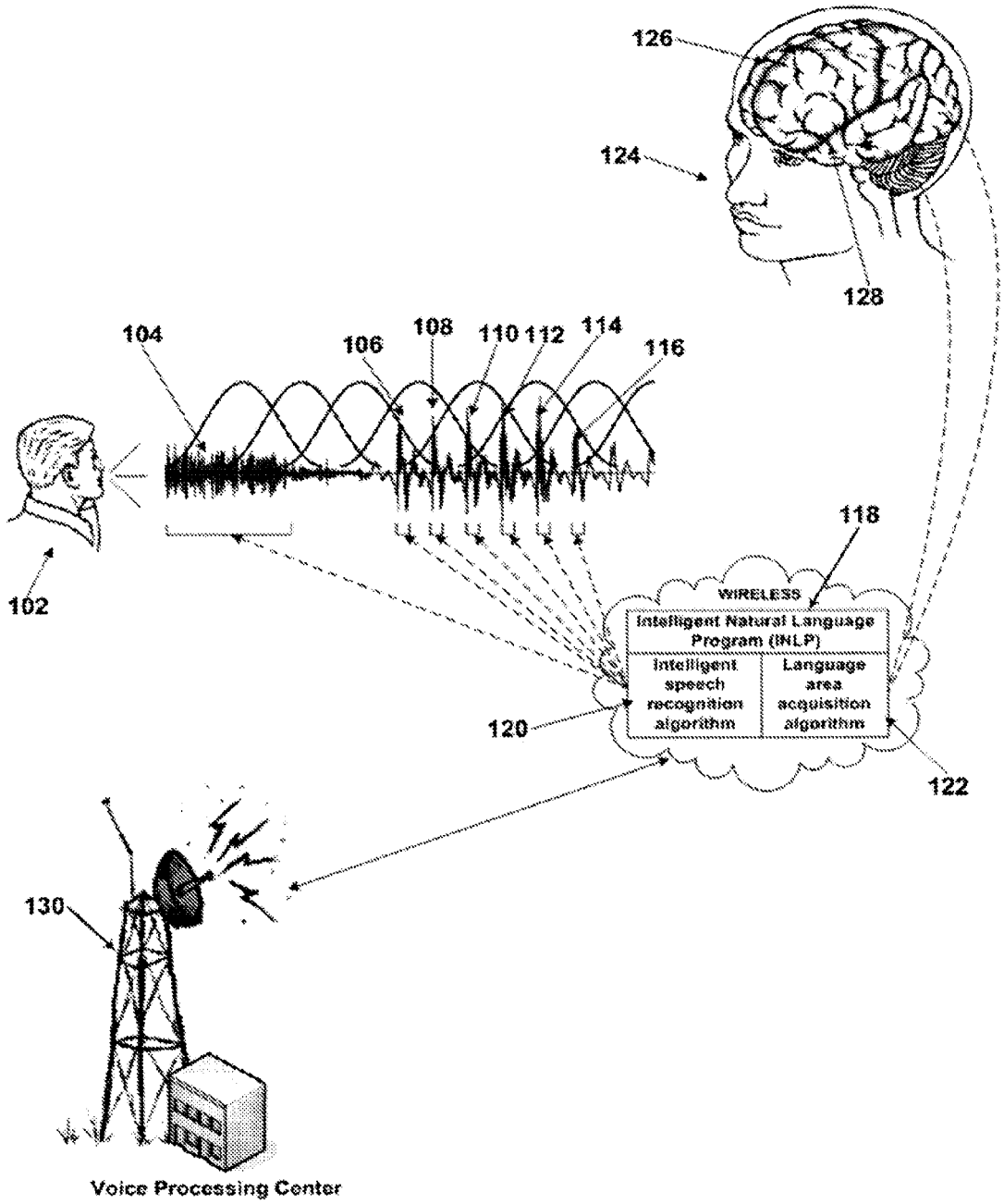
FIG. 1.a – PRIOR ART

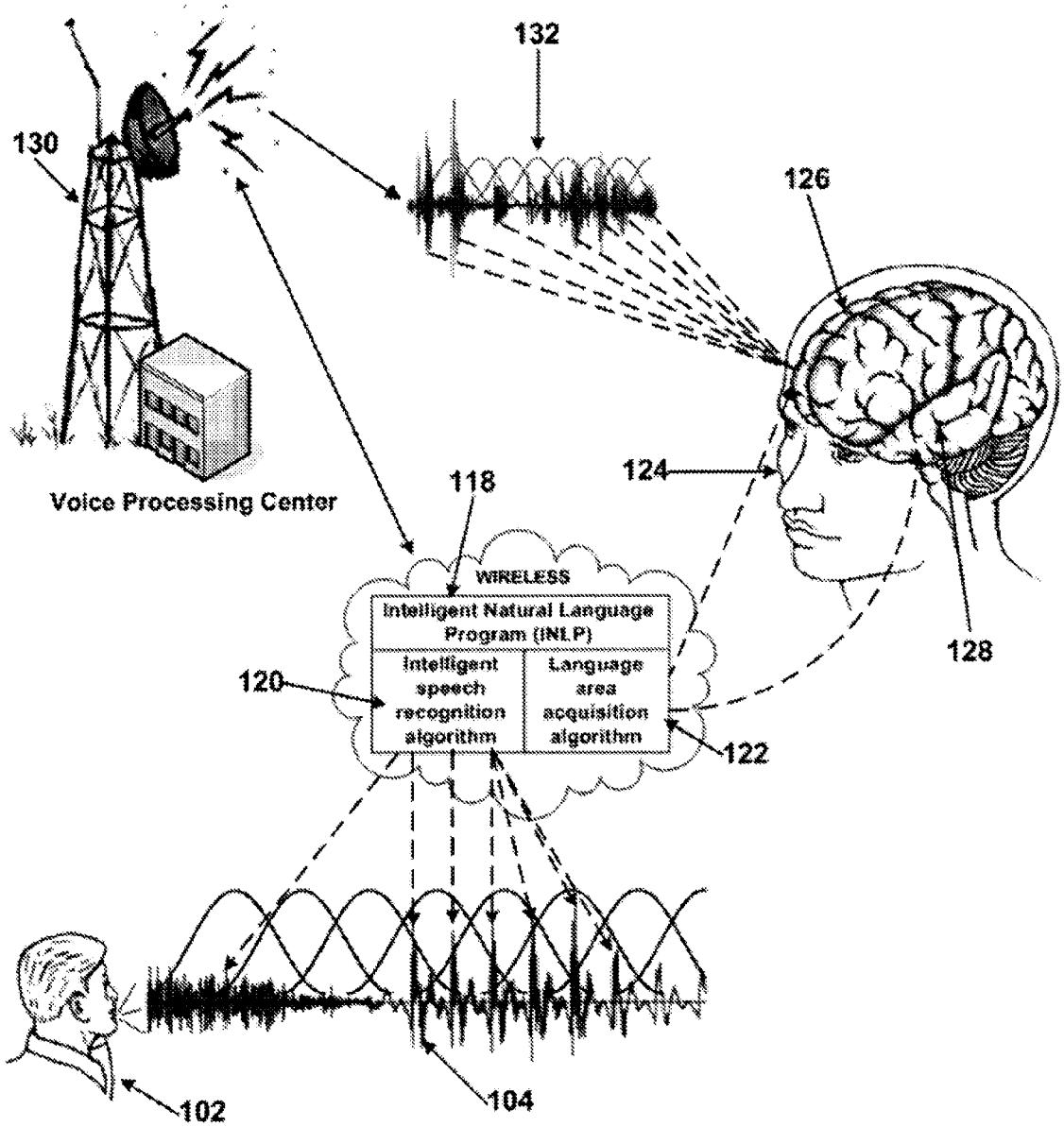
FIG. 1.b – PRIOR ART

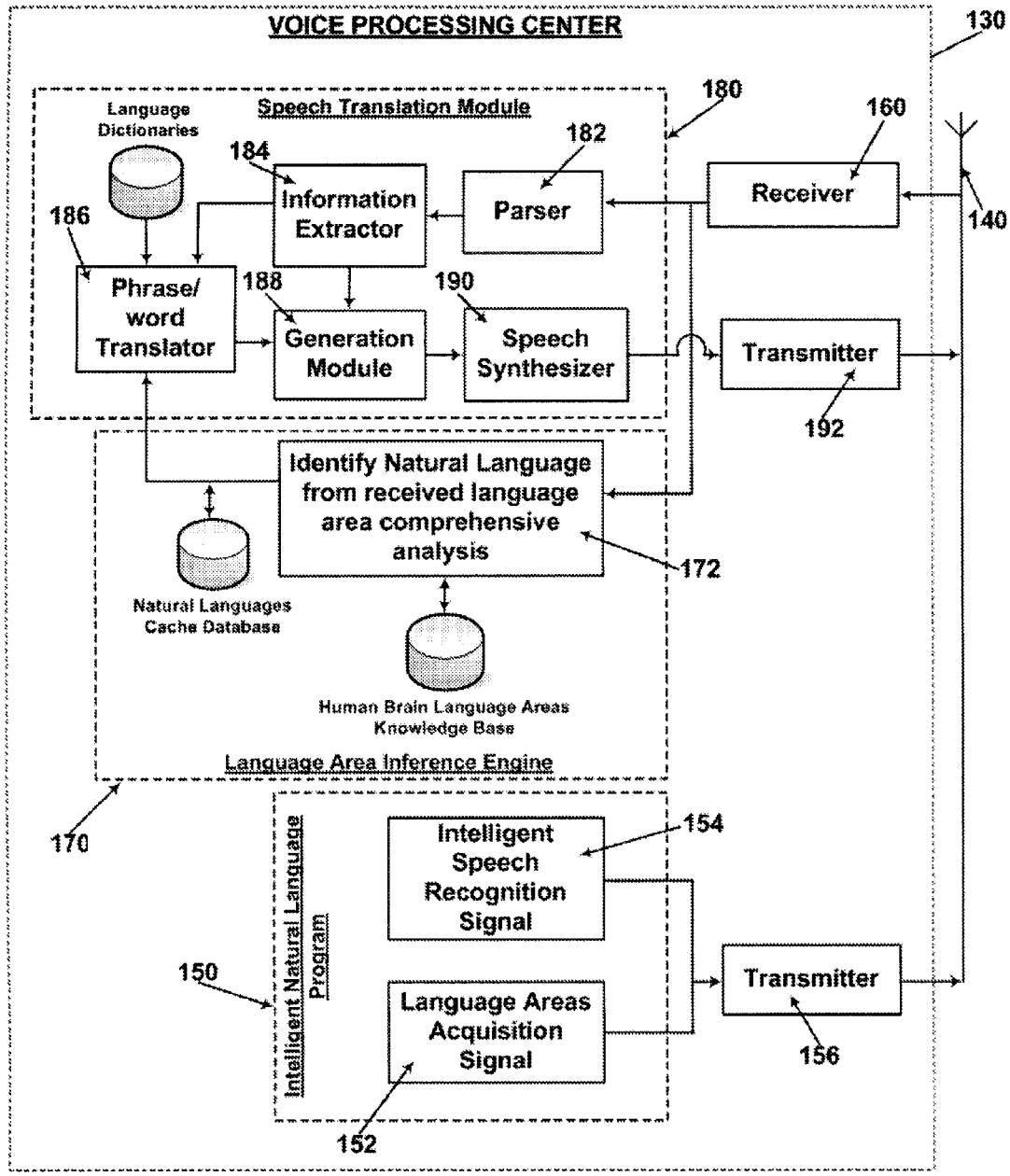
FIG.1.c

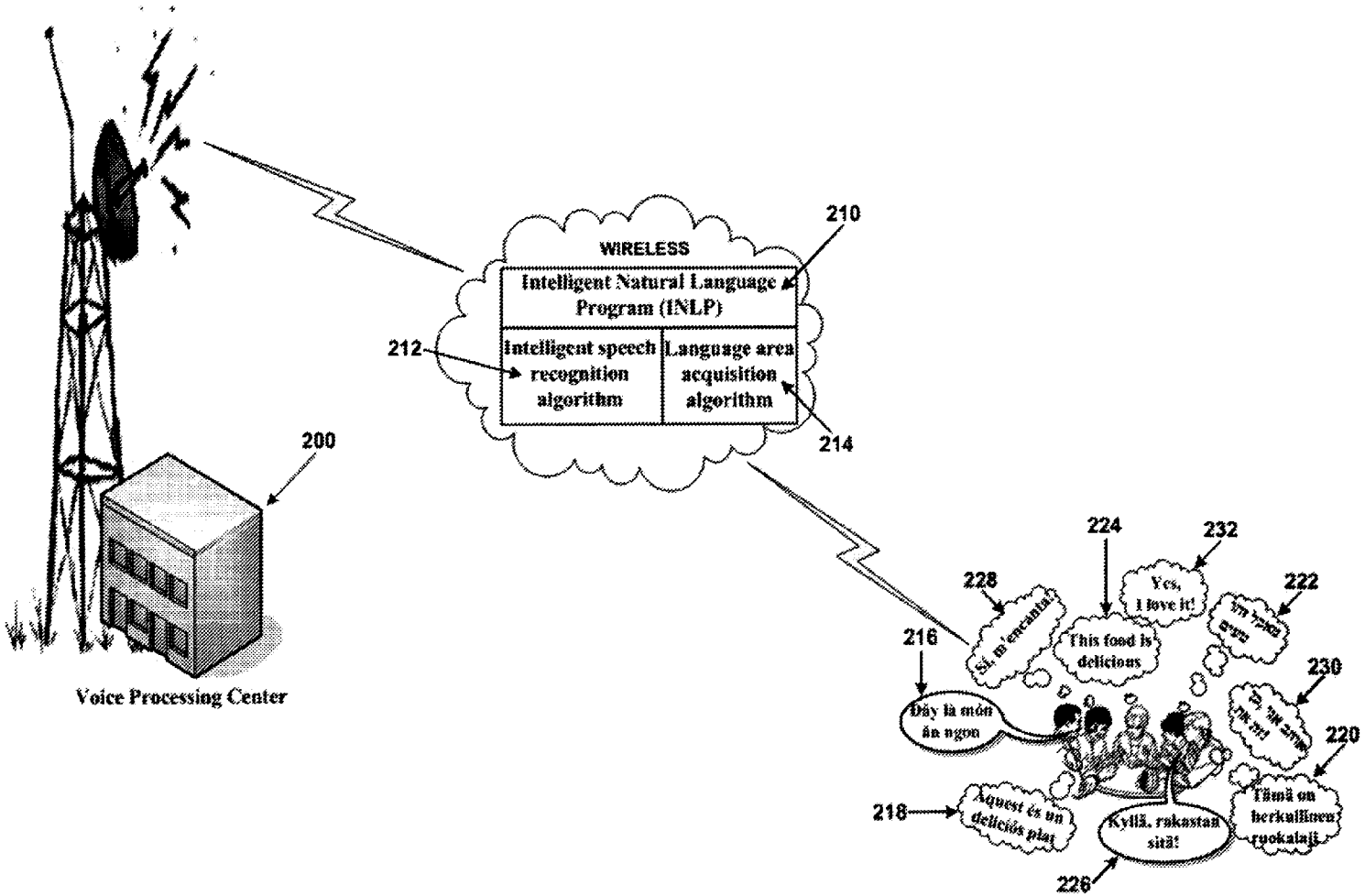
FIG. 2.b

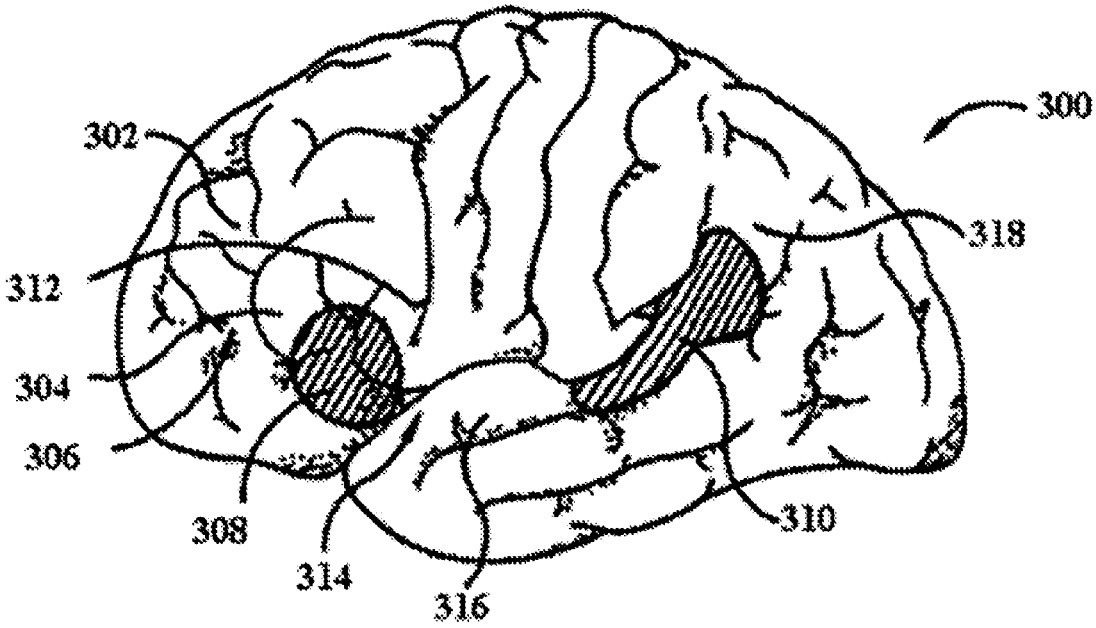
FIG.3.a
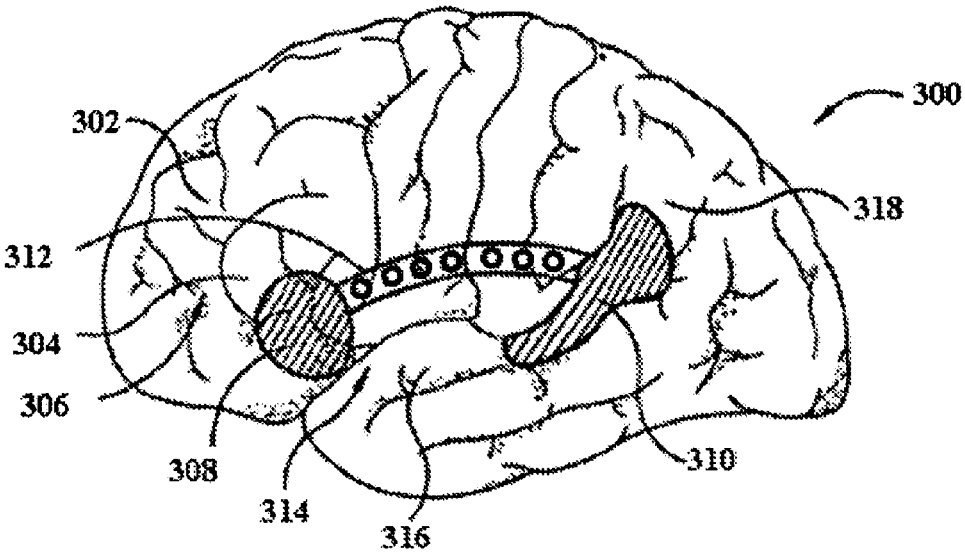
FIG.3.b

AUTOMATED SPEECH TRANSLATION SYSTEM USING HUMAN BRAIN LANGUAGE AREAS COMPREHENSION CAPABILITIES

FIELD OF THE INVENTION

The present invention relates generally to a speech translating method, and more particularly, to automatically translate speech from one language to a language natural to another which is understandable by the language areas of one or plurality of intended recipient brain.

BACKGROUND OF THE INVENTION

U.S. patent application Ser. No. 12/543,054, filed Aug 18, 2009, assigned to the same assignee as the instant application, and which is herein incorporated by reference in its entirely.

Typically, communication is said to be successful between two people if someone speaks and opponent party can understand. In other words the intended recipient's brain language areas can comprehend the speech. The problem of not understanding the speech of others is the cause of language barriers. So, this invention discloses a method to solve the language barrier problem where it is capable of interpreting meaning of speech in one language to a language natural to another—basically to a language the recipient brain can comprehend.

Languages are mankind's principle tools for interacting expressing ideas, emotions, knowledge, memories and values. Languages are also primary vehicles of cultural expressions and intangible cultural heritage, essential to the identity of individuals and groups. Safeguarding endangered languages is a crucial task in maintaining cultural diversity worldwide. According to researchers more than 6,700 languages are spoken in 228 countries. For example, in India more than 250 languages are used for speech. People like to speak in their natural language and prefer to communicate with others in their natural language. This makes it difficult for people to travel to foreign states or countries as they need to learn the foreign language.

Most individuals living in the United States read, write, speak, and understand English. There are many individuals, however, for whom English is not their primary language. The 2000 census shows that 26 million individuals speak Spanish and almost 7 million individuals speak an Asian or Pacific Island language at home. If these individuals have a limited ability to read, write, speak, or understand English, they are limited English proficient, or "Limited English Proficiency." In a 2001 Supplementary Survey by the U.S. Census Bureau, 33% of Spanish speakers and 22.4% of all Asian and Pacific Island language speakers aged 18-64 reported that they spoke English either "not well" or "not at all."

In field of entertainment, if someone wants to watch a foreign movie/performance, they experience problems in clearly understanding the event. Obviously, lots of electronic translator equipments are available in the world, but it only supports popularly spoken languages.

Language barriers and misunderstandings can get in the way of effective communication and create complications in the workplace, including problems with safety. A recent Business Journal article on the rising number of foreign national workers in Charlotte-Mecklenburg's construction industry pointed out—those workers who speak little or no English are at much greater risk of having an accident on the job because of not having a full grasp of safety standards.

Approximately 22% of the Sheraton Corporation's workforce is Hispanic, primarily Mexicans. Language is the main barrier here. To help its employers deal with the language challenge, the company has bilingual employees to serve as translators and mentors. In addition, all printed material is provided in both the essential languages Spanish and English. Another example is Woonsocket Spinning Company—Woonsocket is one of the few remaining woolen mills in the United States. 70% of their employees are foreign-born. Overcoming language barriers is the greatest challenge for both workers and the employer. To help with this, the company hires interpreters or has other employees who speak the language help the non-English speaking employees, particularly during orientation and training. Studies like this suggest companies spend a lot of time and effort to overcome language barriers among employees.

Patients from under developing countries seeking medical care always need to be accompanied with human translators to explain their medical problems and also to understand physician's advice. According to a report, more language interpretation services are needed in Connecticut's hospitals, doctors' offices and other health-care facilities to provide adequate medical care to patients with limited English skills. For example, The Connecticut Health Foundation, a non-profit group based in New Britain, found that use of language interpretation services in medical settings throughout the state is limited, resulting in problems such as misdiagnosis and patient misunderstandings about doctors' instructions. The report advocated that hospitals and other health-care providers work toward providing more face-to-face interpr In the ever growing IT industry people from various nationalities collaborate in meetings and conferences. Due to language barrier they cannot communicate freely resulting in business people investing lot of time and money learning new languages.

Even in marketing, due to language as barrier quality retail and consumer product owners struggle to market their products on international market.

There are number of language translation systems available in the world designed and developed to translate an inputted language to another language. All these methods/systems require a device to capture the voice and deliver. Such systems are known in the prior patents as disclosed in U.S. Pat. No. 4,882,681 to Brotz et al for Remote Language Translating Device. This prior patent disposes the translation of conversation between the users by transmitting/receiving speech using external hardware device. But people would not prefer to carry or even remember to carry the hardware device all the time. Also the disadvantage of such system is that it can be used to convert only a certain number of languages which are pre-programmed on the device.

U.S. Pat. No. 6,161,082 to Goldberg et al for Network based language translation system performs a similar task. It disposes a network based language translation system—basically has a translation software installed on the network. It proves that software over network can do speech translation, but user still has to set their language preferences. More than 67% of world's population do not or have limited computer knowledge, so they cannot set their language preferences and operate high-tech gadgets. Another recent patent is U.S. Pat. No. US 2009/0157410 to Donohoe et al for speech translating system. U.S. Pat. Appl. No. US 2009/0157410 discloses a system for translating speech from one language to a language selected from a set of languages. Such a system disclosed in U.S. Pat. Appl. No. US 2009/0157410 can be applicable only for limited amount of users but more than 6,700 languages are being used by people to express their thoughts around the world.

Another patent is U.S. Pat. No. 4,641,264 to Nitta et al for a Method of Automatic Translation between Natural Languages—this discloses a system for the translation of entire sentences. Then again it also requires an input and output device to capture and deliver the speech. It is not capable to determine the recipients' understandable language. We have to manually set the targeted language or select from pre-defined languages (as target) in the device.

According to DiscoveryChannel.ca report, by using electrodes attached to a persons face and neck, the device detects the electrical signals sent to the person's facial muscles and tongue when specific words are mouthed. The software is able to decode the information into phonemes—the building blocks of words. Since there are only 45 different phonemes used in English, the system is able to predict what phonemes are most likely to appear next to each other. This helps the device translate phrases even if it hasn't heard them before. The system won't help make peace with any hostile aliens just yet, though. It only translates correctly with 62 percent efficiency when faced with a phrase for the first time.

Although there have been many advances in system and software for providing language translation to users interested in communicating in a language other than their own language, there has not been an apparatus or method that facilitate to identify intended recipients' natural language using brain language areas of one or plurality of intended recipients. Accordingly, the present inventor has developed a system that can identify the natural language of one or plurality of intended recipients by their brain language areas and uses the identified natural language for speech translation.

Therefore to overcome all the above language barriers, there is a need for a system to perform automatic translation of speech wherein when one speaks in a natural language others are able to comprehend in their own natural languages without interpreters, hand-held device and language translation books.

SUMMARY OF THE INVENTION

In view of the foregoing disadvantages inherent in the prior art, the general purpose of the present invention is to provide an "Automated Speech Translation System using Human Brain Language Areas Comprehension Capabilities" configured to include all the advantages of the prior art, and to overcome the drawbacks inherent therein.

Speech translation is basically converting from spoken words in one language to another language where the language area of recipient human brain can comprehend. Recipient(s) may not be able to comprehend the speech because of their brain language areas are not tuned to understand the spoken language.

The present invention discloses a method to identify the target language by using brain language areas of one or plurality of intended recipients. The language area of human brain is a large cortical area (in the left hemisphere in most people) containing all the centers associated with language.

The present invention disposes a process where humans are not going be aware a translation is happening in the background. They will be able to speak their own natural language but others surrounding them can automatically understand the speech in their own natural language. This system therefore bridges all communication gaps among people.

The main object of the present invention is to provide an "Automated Speech Translation System using Human Brain Language Areas Comprehension Capabilities" that is capable of providing a translation of speech in one language to a language natural to another which is understandable by the brain language areas of one or plurality of recipient. The present invention thereby replaces interpreters, hand-held device and language translation books.

This invention facilitates tourism. People are now free to travel to any corner of the world. They don't have to carry any hand-held devices. This invention facilitates people to enjoy foreign movie/performances without need of friends as human translators or sophisticated translation devices. Patients can be provided with the right care that they require. This invention also eliminates all miscommunications and reduces death totality in industries. Employers can hire people from any ethnicity as langua This invention also facilitates businessmen from any country to expose their quality products worldwide within a less budget. Everyone can continue to effectively communicate in their own natural language in meetings and conferences while employers can save money on language translation books.

Still another object of the present invention is to provide an automated speech translation system that may enable a smooth communication between users.

All these put together with other aspects of the present invention, along with the various features that describe the present invention, especially those pointed out in the claims section form a part of the present invention. To gain more knowledge of the present invention understanding of the drawings attached and the detailed description is highly essential.

BRIEF DESCRIPTION OF THE DRAWINGS

FIG. 1.*a* illustrates a first embodiment of prior art of an "Automated Speech Translation System using Human Brain Language Areas Comprehension Capabilities" of the present invention.

FIG. 1.*b* illustrates a second embodiment of prior art of an "Automated Speech Translation System using Human Brain Language Areas Comprehension Capabilities" of the present invention.

FIG. 1.*c* illustrates a logical architecture of Voice Processing Center of an "Automated Speech Translation System using Human Brain Language Areas Comprehension Capabilities" of the present invention.

FIG. 2.*a* illustrates two people of the system speaking in their natural language using "Automated Speech Translation System using Human Brain Language Areas Comprehension Capabilities";

FIG. 2.*b* illustrates a group of five people of the system exchanging conversation in their natural language using "Automated Speech Translation System using Human Brain Language Areas Comprehension Capabilities";

FIG. 2.*c* illustrates a group of business people of the system exchanging their business conversation in their natural language using "Automated Speech Translation System using Human Brain Language Areas Comprehension Capabilities";

FIG. 2.*d* illustrates spokesman of the system addressing a crowd in his natural language using "Automated Speech Translation System using Human Brain Language Areas Comprehension Capabilities".

FIG. 3.*a* is a partially schematic, isometric illustration of a human brain illustrating areas associated with language comprehension.

FIG. 3.*b* illustrates the electrodes placed in between language areas to record brain language areas activity for constructing "Human Brain Language Areas Knowledge Base" of present invention.

DETAILED DESCRIPTION OF THE INVENTION

Figure 2:
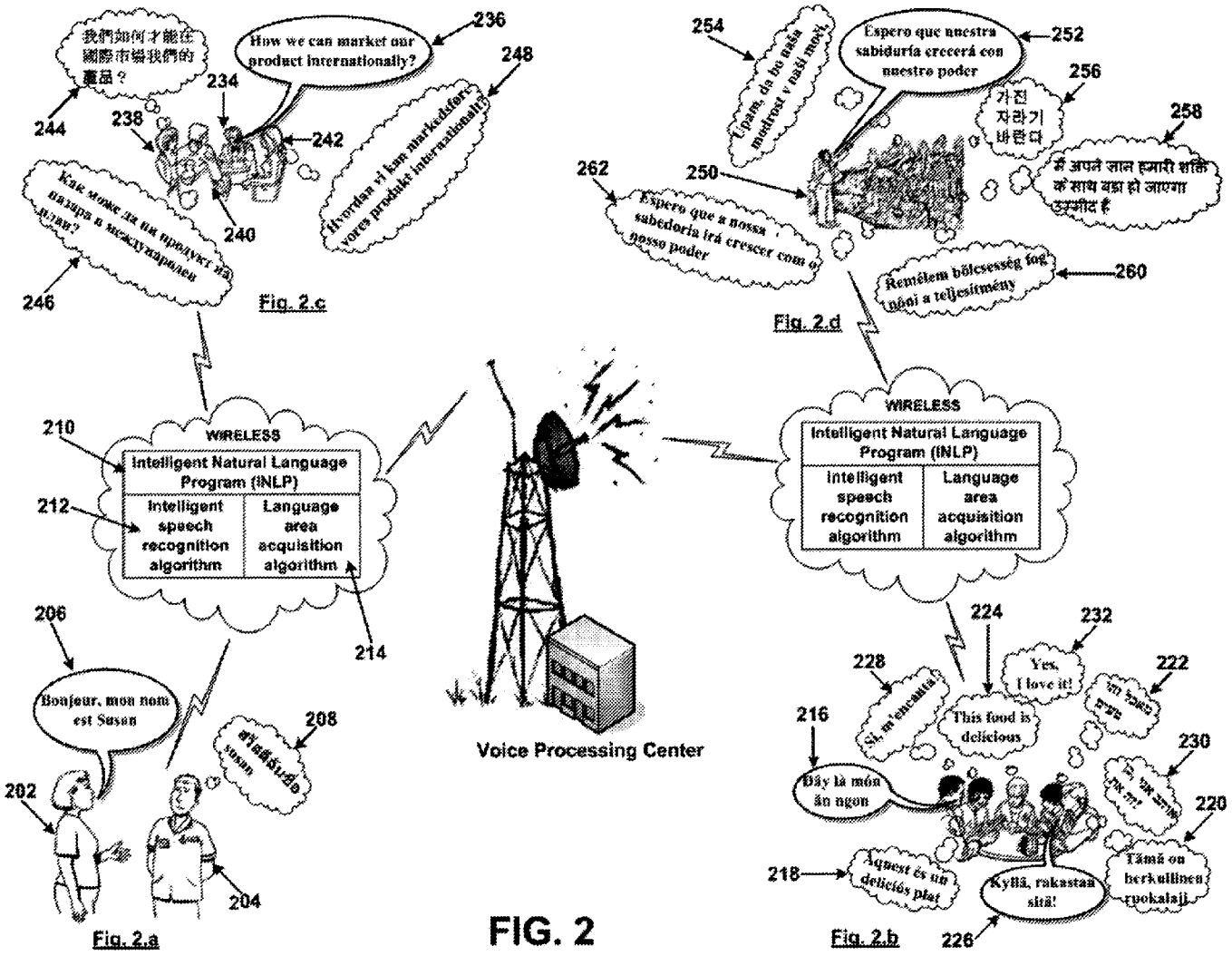
FIG. 2 illustrates the detailed operation of the present invention, comprising.
Figure 4:
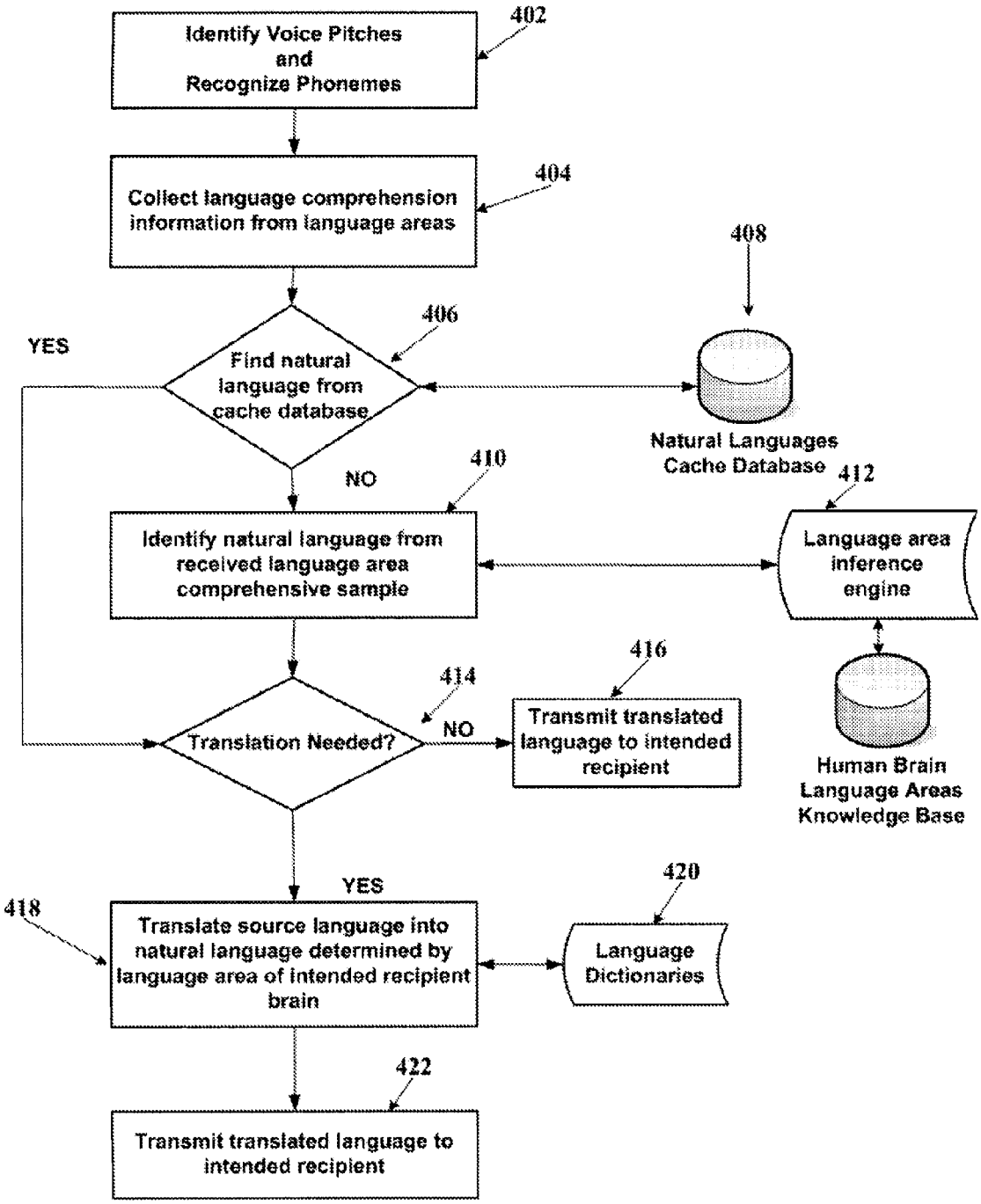
FIG. 4 illustrates a processing flow of this invention.

Reference will now be made in detail to the preferred embodiments of the present invention, examples of which are illustrated in the accompanying drawings, wherein like reference numerals refer to like elements throughout.

Communication is said to be effective between two people, if one speaks and intended recipient can understand. In other words the intended recipients' brain language area can comprehend the words/sentence/speech. The present invention basically does that—interpreting meaning of word(s) in a language understandable by language areas of intended recipient brain.

The "Automated Speech Translation System using Human Brain Language Areas Comprehension Capabilities" of present invention has three main logical processing units—Intelligent Natural Language Program (INLP), Language Inference Engine and Speech Translation Module. The human ear can hear frequencies at ~70 decibels. When we talk our thoughts are converted into voice signals and transmitted into the surrounding regions. The human speech contains the syntactic combination of lexicals and names that are drawn from very large vocabularies. Each spoken word is created out of the phonetic combination of a limited set of vowel and consonant speech sound units. These vocabularies, the syntax which structures them, and their set of speech sound units, differ creating the existence of many thousands of different types of mutually unintelligible human languages. This system employs a software broadcasting technique to broadcast the Intelligent Natural Language Program (INLP) over the air. The "Automated Speech Translation System using Human Brain Language Areas Comprehension Capabilities" of present invention makes use of electromagnetic radiation to broadcast the Language Area Acquisition Signal directed towards the intended recipient's head. The voice processing center of present invention receives the electromagnetic frequencies which contain a rapid analysis of the language area of intended recipient's brain. The rapid analysis of the brain language areas of one or plurality of intended recipients, are analyzed within seconds to provide an evaluation of the state of the cell's structure. Only information, not energy, is exchanged.

As shown in FIG. 1.*a*, the spoken dialog of man 102 travels through air in vocalized form 104. Spoken dialog of man 102 contains the syntactic combination of lexicals and names that are drawn from very large vocabularies. Each spoken dialog of man 102 is created out of the phonetic combination of a limited set of vowel and consonant speech sound units. These vocabularies, the syntax which structures them, and their set of speech sound units, differ creating the existence of many thousands of different types of mutually unintelligible human languages. An Intelligent Natural Language Program 118 of present invention, travels over air and looks for an acoustic waveform or voice pitches 104, 106, 108, 110, 112, 114, 116 in the air. The property of spoken voice of human being is determined by the rate of vibration of the vocal cords. The greater number of vibrations per second, the higher the pitch. The rate of vibration, in turn, is determined by the length and thickness of the vocal cords and by the tightening or relaxation of these cords.

As shown in FIG. 1.*b*, an Intelligent Speech Recognition Algorithm 120 of Intelligent Natural Language Program 118 is capable of identifying an acoustic waveform or voice pitches consisting of alternating high and low air pressure travelling through the air. The Intelligent Speech Recognition Algorithm 120 of Intelligent Natural Language Program 118 identifies the voice pitches 104, 106, 108, 110, 112, 114, 116 (shown in FIG. 1.*a*) of man 102 from the air and identifies the phoneme-level sequences from it. The Intelligent Speech Recognition Algorithm 120 of Intelligent Natural Language Program 118 is capable of differentiate an acoustic wave form and normal waveform in the air. Such a technique is disclosed in U.S. Pat. No. 6,219,635 B1 entitled as "Instantaneous Detection of Human Speech Pitch Pulses", issued to Coulter et al and U.S. Pat. No. 3,335,225 issued to Campanella et al. Also a similar method is disclosed in ScienceDirect Journal entitled as "Boltzmann analysis of acoustic-waveforms using virtual instrument software" issued on Sep. 27, 1999 by Robert B. Patuzzi and Greg A. O'Beirne, The Auditory Laboratory, Department of Physiology, University of Western Australia, made of record and incorporated herein by reference. The Language area acquisition algorithm 122 signal of the Intelligent Natural Language Program 118 is directed towards the intended recipient 124 who is in the audible range to voice of man 102. The Language area acquisition algorithm collects an evaluation of the state of the language areas structure and also the degree of stress it is experiencing while the intended recipient listens and sends it to voice processing center. The voice processing center receives the electromagnetic frequencies which contain a rapid analysis of the language areas of intended recipient's 124 brain.

The analysis of the language areas of brain 126 of intended recipient 124 is then compared with "Human Brain Language Areas Knowledge Base" (shown in FIG. 1.*c*) to identify the natural language of intended recipient 124. As shown in FIG. 1.*c*, The "Human Brain Language Areas Knowledge Base" is an exhaustive, comprehensive, obsessively massive list of brain samples of language areas activity information; where the list of samples are collected information from experimental test results data of brain's language areas activities and collected information from neurologists about brain's language areas comprehension. The "Human Brain Language Areas Knowledge Base" comprises of millions and millions of brain data collected by recording the language area activity of the human brains. People from each of the natural language spoken around the world are surveyed; while listening to the speech in their natural language, brain activity signals from the language area of their brain are recorded. These signals act as raw translations that indicate how the brain perceives the speech in their natural language. The recorded brain language areas activity signals are then analyzed and the characteristics of the brain language area activity signals are stored in the "Human Brain Language Areas Knowledge Base" along with the name of corresponding natural language.

For example, for building the sample for French language, a French speech is presented to a person for whom French is the natural language. During this experiment the electrodes (as shown in FIG. 3.*b*) are connected to the language areas (i.e., Left and Right hemispheres and frontal lobes) of his/her brain. While listening to a French speech, his/her brain language area activity is being recorded. The recorded brain language areas activity signals are then sent to a translator that uses special algorithms to decode the brain language area activity signals to determine the characteristics of the French language. The test results along with name of the natural language (i.e., French) information are being stored in the "Human Brain Language Areas Knowledge Base".

The "Human Brain Language Areas Knowledge Base" thus built contains a massive store house of characteristics of "brain language areas activity signals" for over 6,700 natural languages spoken across the world. This massive repository of language characteristics is later used by the present invention to identify the natural language of the user. The identified natural language is fed into Speech Translation Module 180 to generate the corresponding words in particular natural language for spoken sentence 104 of man 102 (as shown in FIG. 1.*b*). The generated sentence in identified natural language of intended recipient 124 (as shown in FIG. 1.*b*) is then fed into Speech Synthesizer 190 to generate an audio signal. The speech synthesizer 190 provides the translated audio signals of man's 102 (as shown in FIG. 1.*b*) natural language sentence to broadcast to the intended recipient 124. Thus, as shown in FIG. 1.*b* the language areas of brain 126 of intended recipient 124 comprehends the spoken sentence 104 of a man 102 by hearing the acoustic waveform 132 on air.

As shown in FIG. 1.*c*, Voice Processing Center operates using a Language Area Inference Engine 170, a Speech Translation Module 180, and an INLP 150. Language Area Inference Engine 170 compares the analysis of the language areas of intended recipient's brain with "Human Brain Language Areas Knowledge Base" to identify intended recipient's natural language. The Language Area Inference Engine 170 is an artificial intelligence program that derives natural language information from a "Human Brain Language Areas Knowledge Base". Language Area Inference Engine 170 is considered to be a special case of reasoning engines, capable of employing both induction and deduction methods of reasoning to identify the natural language from received language area comprehensive analysis. As shown in FIG. 1.*c*, the receiver antenna receives the phoneme-level sequences, and language area comprehensive information of intended recipient 124 (as shown in FIG. 1.*b*) and then analyzes and identifies the source and target natural languages using Language Area Inference Engine 170. These phonemes that are identified from voice pitches (i.e. 104, 105, 108, 110, 112, 114, 116 as shown in FIG. 1.*a*) of man 102 (as shown in FIG. 1.*b*) by an Intelligent Speech Recognition Algorithm 120 (as shown in FIG. 1.*b*) are then combined in word groups to form recognizable words in one of the natural languages spoken in the world which is presented in language dictionaries. The formed sentence is then translated to target natural language which identified from intended recipient's 124 (as shown in FIG. 1.*b*) language area comprehensive information using Language Area Inference Engine 170.The translated language sentence is then passed to speech synthesizer 190 to convert as the voice signals 132 (as shown in FIG. 1.*b*) and then transmitted to the intended recipient 124 (as shown in FIG. 1.*b*) over the air.

In human beings, it is the left hemisphere that usually contains the specialized language areas. While this holds true for 97% of right-handed people, about 19% of left-handed people have their language areas in the right hemisphere and as many as 68% of them have some language abilities in both the left and the right hemisphere. Both the two hemispheres are thought to contribute to the processing and understanding of language: the left hemisphere processes the linguistic of prosody, while the right hemisphere processes the emotions conveyed by prosody.

FIG. 3 is an isometric, left side view of the brain 300. The targeted language areas of the brain 300 can include Broca's area 308 and/or Wernicke's area 310. Sections of the brain 300 anterior to, posterior to, or between these areas can be targeted in addition to Broca's area 308 and Wernicke's area 310. For example, the targeted areas can include the middle frontal gyrus 302, the inferior frontal gyrus 304 and/or the inferior frontal lobe 306 anterior to Broca's area 308. The other areas targeted for stimulation can include the superior temporal lobe 314, the superior temporal gyrus 316, and/or the association fibers of the arcuate fasciculus 312, the inferior parietal lobe 318 and/or other structures, including the supramarginal gyrus, angular gyrus, retrosplenial cortex and/or the retrosplenial cuneus of the brain 300.

There are four distinct cortical language-related areas in the left hemisphere. These are: (1) a lateral and ventral temporal lobe region that includes superior temporal sulcus (STS) 316, middle temporal gyrus (MTG), parts of the inferior temporal gyrus (ITG) and fusiform and parahippocampal gyri; (2) a prefrontal region that included much of the inferior and superior frontal gyri, rostral and caudal aspects of the middle frontal gyrus, and a portion of the anterior cingulate; (3) angular gyrus; and (4) a perisplenial region including posterior cingulate, ventromedial precuneus, and cingulate isthmus. These regions were clearly distinct from auditory, premotor, supplementary motor area (SMA), and supramarginal gyrus areas that had been bilaterally activated by the tone task. The other large region activated by the semantic task is the right posterior cerebellum.

The first language area within the left hemisphere is called Broca's area 308. The Broca's area 308 doesn't just handle getting language out in a motor sense it is more generally involved in the ability to deal with grammar itself, at least the more complex aspects of grammar. The second language area is called Wernicke's area 310.

By analyzing data from numerous brain-imaging experiments, there are three distinguished subareas within Wernicke's area 310. The first sub-area responds to spoken words (including the individual's own) and other sounds. The second sub-area responds only to words spoken by someone else but is also activated when the individual recalls a list of words. The third sub-area is more closely associated with producing speech than with perceiving it. All of these findings are still compatible, however, the general role of Wernicke's area 310, relates to the representation of phonetic sequences, regardless of whether the individual hears them, generates them, or recalls them from memory.

FIG. 2 illustrates the broad structure of this present invention. FIG. 2.*a* shows a woman 202 saying her name in her natural language French—as shown in 206. Intelligent Speech Recognition Algorithm 212 recognizes the voice pitches and improves the recognition rate of the spoken dialog of woman 202 in three ways. First, generate phoneme sequence from recognized voice pitches. This phoneme sequence contains substitution, insertion and deletion of phonemes, as compared to a correct transcription which contains only expected phonemes. Second, activate a hypothesis as to the correct phoneme sequence from noisy phoneme sequence by filtering out false first choices of the hypotheses and selecting grammatically and semantically plausible best hypotheses. Third, provide a phoneme and word hypotheses to the parser which consist of several competitive phoneme or word hypotheses each of which are assigned the probability of being correct. The Intelligent Speech Recognition Algorithm 212 identifies the phoneme-level sequence i.e., phoneme and word hypotheses from the spoken sentence of woman 202—as shown in 206.

Simultaneously, a rapid analysis of brain language areas activity of man 204 is collected by directing language area acquisition signal towards man's 204 head. The rapid analysis of man 204 brain includes the language area comprehensive information like Language Comprehension, Semantic Processing, Language Recognition, and Language Interpretation from brain language areas of man 204 and this collected information is sent to Voice Processing Center.

As shown in FIG. 1.*c*, Voice Processing Center 130 receives the signals having rapid analysis of language comprehensive information of man 204 brain and phoneme-level sequence of spoken sentence of woman 202. A Voice Processing Center 130 is operated by a Language Area Inference Engine 170 which includes a "Human Brain Language Areas Knowledge Base". The Language Area Inference Engine looks for identical natural language for received language comprehensive information in Natural Languages Cache Database. The Natural Languages Cache database is a collection of natural language data. Retrieval of original natural language is expensive owing to longer access time; the cache is a cost effective way to store the original natural language or other computed languages. It acts like a temporary storage area where frequently accessed natural language data can be stored for rapid access. Once the data is stored in the cache, it can be used in the future by accessing the cached copy rather than re-fetching or re-computing the original natural language data. The Natural Languages Cache Database is thus an effective approach to achieve high scalability and performance. If there is no identical natural language information found in Natural Language Areas Cache Database, Language Area Inference Engine looks for the identical natural language information from "Human Brain Language Areas Knowledge Base". If any identical characteristics found in "Human Brain Language Areas Knowledge Base" then Language Area Inference Engine selects the corresponding natural language name and it stores in Natural Language Areas Cache Database for future references. The identified natural language information fed into speech translation module 180 for speech translation.

The accurate translation of input speech is done by sophisticated parser 182, Phrase/Word Translator 186 and generation module 188. The speech translation module 180 comprises the Parser 182, Information Extractor 184, Phrase/Word Translator 186 and Generation Module 188. The parser 182 performs the process of prediction including complete semantic interpretations, constraint checks, and ambiguity resolution and discourse interpretations. The parser 182 handles multiple hypotheses in parallel rather than a single word sequence.

As shown in FIG. 1.*c*, a Phrase/Word Translator and generation module 188 are designed to generate the appropriate spoken sentences with correct articulation control. As shown in FIG. 1.*c*, the Language Dictionaries contains the set of grammatical rules of all natural languages (which are spoken in the world) and all natural language words alphabetically, with definitions, etymologies, phonetics, pronunciations. The Language dictionaries provide an input to phrase/word translator during the conversation, and is continuously up-dated during processing. Thus, the appropriate sentence has been generated for spoken sentence of woman 202 to the natural language of man (as shown in FIG. 2.*a*)—as shown in 208 of FIG. 2.*a* where brain language areas of man can comprehended.

This system performs real-time translations, which is far better performance than text-based machine translation systems. Unlike traditional methods of machine translation in which a generation module 188 process is invoked after parsing is completed; this system concurrently executes the generation process during parsing. It employs a parallel incremental generation scheme, where the generation process and the parsing process run almost concurrently. This enables the system to generate a part of the vocal expression of woman 202 during the parsing of the rest of the vocal expression of woman 202. Thus this system stimulates a live feeling—where one speaks and instantaneously the intended recipients can comprehend the speech in their natural languages.

The "Automated Speech Translation System using Human Brain Language Areas Comprehension Capabilities" of present invention handles the bi-directional conversations. This system provides the bidirectional translation with an ability to understand interaction at the discourse knowledge level, predict possible next vocal expression, understand what particular pronouns refer to, and also provides high-level constraints for the generation of contextually appropriate sentences involving various context-dependent phenomena.

F1G. 2.*b* illustrates the conversation between friends who are all foreign-language speaking people. Vietnamese speaking person is saying "This food is delicious" in his natural language such as shown in 216, this sentence is comprehended as shown in 218 by the Catalan speaking person, as shown in 220 by Finnish speaking person, and as shown in 222 by Hebrew speaking person and also as shown in 224 by English speaking person. The Finnish speaking person acknowledges back to them in his natural as shown in 226. Others comprehend the Finnish sentence as shown in 228, as shown in 230, as shown in 232 respectively using present invention of "Automated Speech Translation System using Human Brain Language Areas Comprehension Capabilities".

Similarly, FIG. 2.*c* illustrates a business conversation. A boss 234 is asking as shown in 236 to his subordinates. His subordinates are a Chinese woman 238, Bulgarian man 240, and Danish woman 242. The boss's spoken dialog is comprehended as shown in 244 by Chinese speaking woman, as shown in 246 by Bulgarian speaking man, and as shown in 248 Danish speaking woman respectively using present invention of "Automated Speech Translation System using Human Brain Language Areas Comprehension Capabilities".

FIG. 2.*d* illustrates the spokesman 250 is giving a speech in his natural language Spanish as shown in 252 to a crowd. There are Slovenian, Korean, Hindi, Hungarian, and Portuguese speaking people in the crowd. So, the spokesman's Spanish speech is automatically comprehended by Slovenian speaking person as shown in 254, by Korean speaking person as shown in 256, by Hindi speaking person as shown in 258, by Hungarian speaking person as shown in 260, and by Portuguese speaking person, as shown in 262, using present invention of "Automated Speech Translation System using Human Brain Language Areas Comprehension Capabilities".

As described above, the present invention discloses a system for translating a speech in one language to a language native to the intended recipient(s). Accordingly, the present invention discloses a system of comprehending natural languages without the use of any handheld translators. This invention employs a system where there will no longer be a need to learn new language. Effective communication is now feasible between people speaking different languages. This system explores the capabilities of the human brain and utilizes the language information of the brain and performs the automatic translation in the background. It should be noted that with all the reading of language area of the human brain—the human brain will not be affected or caused any harm during this process.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application. Although the present invention has been described with reference to particular embodiments, it will be apparent to those skilled in the art that variations and modifications can be substituted without departing from the principles and spirit of the invention.

REFERENCES

1. "How the brain learns to read" By David A. Sousa

2. "Natural Language Generation in Artificial Intelligence and Computational Linguistics" By Cile L Paris, William R. Swartout, William C. Mann 3. "Artificial intelligence methods and applications" By Nikolaos G. Bourbakis 4. T. Morimoto et al., "Spoken Language Translation," *Proc. Info Japan,* Tokyo, 1990.

5. K. Kita, T. Kawabata, and H. Saito, "HMM Continuous Speech Recognition using Predictive LR Parsing," Proc. IEEE Int'l Conf. Acoustics, Speech, and Signal Processing, 1989.

6. "Natural language processing technologies in artificial intelligence" By Klaus K. Obermeier 7. "Advances in artificial intelligence: natural language and knowledge-based" By Martin Charles Golumbic 8. "Pediatric otolaryngology", Volume 1 of fourth edition By Charles D. Bluestone, Cuneyt M. Alper, Sylvan E. Stool, Ellis M. Arjmand, Margaretha L. Casselbrant, Joseph E. Doh 9. Artificial Neural Net Based Signal Processing for Interaction with Peripheral Nervous System. In: Proceedings of the 1st International IEEE EMBS Conference on Neural Engineering. pp. 134-137. Mar. 20-22, 2003.

11. U.S. Pat. No. 6,356,865, issued to Franz et al., entitled "Method and system for performing spoken language translation"

12. U.S. Pat. No. 7,392,079, issued to Donoghue et al., entitled "Neurological Signal decoding"

13. U.S. Pat. No. 7,574,357, issued to Jorgensen et al., entitled "Applications of sub-audible speech recognition based upon electromyographic signals"

I claim:

1. A speech translation system to translate a speech originating from a source entity into a speech that can be understood by other entities' brain language areas, wherein said a source entity is a human being;

wherein said the other entities are human beings;

wherein said the brain language areas are nerve cells in a human brain's Left hemisphere and Right hemisphere, wherein said Right hemisphere is an region located in the frontal lobe usually of the left cerebral hemisphere and associated with the motor control of speech, wherein said Left hemisphere is an area in the posterior temporal lobe of the brain involved in the recognition of spoken words;

said speech translation system comprising:

a Voice Processing Center.

2. The speech translation system according to claim 1, wherein a Voice Processing Center for handling the speech signals analyses and determining the natural language of one or plurality of said entities who are listening to the speech of said source entity, wherein said process the speech signals analyses are processing the signals in a digital representation.

3. A method to broadcast the signals for collecting the voice pitches consisting of alternating high and low air pressure travelling through the air and direct the signals towards the said other entities head to collect rapid analysis of the said brain language areas while listening to the speech of said source entity, wherein said rapid analysis of the said brain language areas is the analysis of brain language areas activities while hearing the speech of said source entity.

4. A method according to claim 3, comprising:

an Intelligent Natural Language Program where it travels over the air and looks for an voice pitches consisting of alternating high and low air pressure travelling through the air and collecting the said brain language areas comprehension characteristics of said other entities who are all in the audible range of said the voice pitches consisting of alternating high and low air pressure travelling through the air, said an intelligent natural language program comprising:

an intelligent speech recognition algorithm identities an acoustic waveform consisting of alternating high and low air pressure travelling through the air and recognizes the phoneme-level sequences from an acoustic waveform;

a Language Area Acquisition Algorithm collects said language areas comprehensive information from the said brain language areas of said other entities said who are in audible range of speech of a said source entity.

5. A method to isolate the phoneme-level sequences, and rapid analysis of the language comprehension of said brain language areas of one or plurality of said entities, from received signal.

6. A method to determine the natural language of intended one or plurality of said entities using collection of human said brain language areas comprehension characteristics, wherein said human brain language areas comprehension characteristics are the digital data representation of human said brain language areas activity while hearing any audible speech.

7. A method according to claim 6, comprising:

a Language Area Inference Engine is a routine that derives natural language information from the collection of Human Brain Language Areas Comprehension characteristics.

8. The speech translation system according to claim 7, wherein said Language Area Inference Engine to identify the natural language from received language area comprehensive analysis, said Language Area Inference Engine further comprising:

a "Human Brain Language Areas Knowledge Base" is the collection said Human Brain Language Areas Comprehension characteristics;

a routine to Identify Natural Language from received language area comprehensive analysis;

the Natural Languages Cache database is a collection of identified natural languages data.

9. The speech translation system according to claims, wherein said "Human Brain Language Areas Knowledge Base" is an exhaustive, comprehensive, obsessively massive list of brain samples of language areas activity information; wherein said the list of samples are collected information from experimental test results data of brains language areas activities and collected information from neurologists about brain's language areas comprehension, said "Human Brain Language Areas Knowledge Base" comprises of plurality of brain data collected by recording the brain language area activity for each of the natural language spoken around the world.

10. The speech translation system according to claim 8, wherein said Natural Languages Cache database is a temporary storage area of identified natural languages to frequently access the natural language data said Natural Languages Cache database used for further said natural language identification method by accessing the cached copy rather than re-fetching or recomputing the original natural language data.

11. A method to translate the speech sentence of said source entity in natural language of said source entity into a speech sentence of natural language of said other entities, wherein said natural language is the language a human being learns from birth.

12. A method according to claim 11, comprising:

a Speech Translation Module for building the information content with grammatical rules of the natural language from received phoneme-level sequences, and translate to identified natural languages which said identifying the natural languages from language area comprehensive information by said language area inference engine, wherein said translate is translating built information content to said natural languages identified by said language area inference engine using language dictionaries, said Speech Translation Module comprising:

a parser to activate a hypothesis as to the correct phoneme sequence from the elliptical, ill-formed sentences that are appeared in the speech;

an information extractor to form a sentence from phoneme-level sequences;

a phrase/word translator is closely integrated with Language Inference Engine and Language dictionaries to translate words of source entity into words in natural languages of other entities;

a generation module integrated with said phrase/word translator in order to generate the most specific expressions using past cases and their generalization, while maintaining syntactic coverage of the generator;

a speech synthesizer connected to said output of said generation module so as to broadcast audible speech which is the translation of said spoken words in said target language.

13. The speech translation system according to claim 12, wherein said language dictionaries is an exhaustive, comprehensive, obsessively massive dictionaries of all words from each of the natural languages spoken around the world, said the language dictionaries are used for translating the spoken word to any of the other natural languages, steps of building said the language dictionaries:

collecting words and set of grammatical rules presents in each natural language spoken in the world;

storing the words alphabetically, with definitions, etymologies, phonetics, pronunciations.

14. A method to identify the natural language of one or plurality of said entities using said brain language areas of each said entity, said method comprising the steps of:

directing said Language Areas Acquisition signal towards one or plurality of said entities while listening to the speech of said source entity;

collecting rapid analysis of the brain language areas activity of one or plurality of said entities while listening to the speech of said source entity;

decoding the language comprehension features from the said collected brain language areas rapid analysis;

selecting the identical said language comprehension features of brain language areas from said "Human Brain Language Areas Knowledge Base" by comparing language comprehension features of said collected brain language areas rapid analysis characteristics with entries in said "Human Brain Language Areas Knowledge Base";

selecting the equivalent name of natural language information for matched entry of said "Human Brain Language Areas Knowledge Base" when identical language comprehension features of said brain language areas rapid analysis are matched with one of the entry in said "Human Brain Language Areas Knowledge Base".

15. A method to build the "Human Brain Language Areas Knowledge Base" by collecting the massive store house of characteristics of brain language areas comprehension for all natural languages spoken across the world, said method comprising the steps of:

presenting an audible speech in particular natural language presented to a human being for whom particular natural language is the language he/she learns from birth;

connecting the materials to the language areas of a human being's brain to make contact with the neurons of said language areas of his/her brain during the experiment, wherein said materials are the electrodes used to make contact with the neurons of brain;

recording said a human being's brain language areas activity while listening to the audible speech in a particular natural language;

translating the recorded said brain language area activity signals using a translator that uses algorithms to decode the recorded signals said in step of recording brain language areas activity to determine the characteristics of the particular natural language;

storing the test results along with name of the natural language information in the said "Human Brain Language Areas Knowledge Base"; said steps of building the "Human Brain Language Areas Knowledge Base" are executed repeatedly with human beings for all natural languages spoken in the world.

16. A method to allow the said entities to comprehend the language spoken by said other entities wherein comprehend said brain language areas comprehend, said method comprising the steps of:

recognizing voice pitches consisting of alternating high and low air pressure travelling through the air, originating from a said source entity and identifying the phoneme-level sequences by said an intelligent speech recognition algorithm of said Intelligent Natural Language Program;

identifying the said other entities who are all in the audible range of said voice signal originating from a source;

directing said language areas acquisition signal towards brain language areas of said other entities;

collecting rapid analysis of said brain language areas comprehensive information of said other entities;

analyzing phonemes and rapid analysis of said brain language areas comprehension of said other entities in said voice processing center;

identifying the said natural language of said entities by comparing received language areas comprehension features of brain language areas of said entities with said "Human Brain Language Areas Knowledge Base";

identifying the said natural language of phoneme-level sequence of speech of said source entity;

translating the spoken sentence of said source entity in to one or plurality of said natural languages identified in said step identifying the natural language;

broadcasting said each translated sentence with a said voice synthesizer to one or plurality of intended said entities.

* * * * *